Nov. 20, 1962  W. A. MOLANDER, JR., ETAL  3,065,145
STRADDLE FLAPPER CONTROLLED HYDRAULIC VALVE
Filed June 4, 1959  5 Sheets-Sheet 1

WILLIAM A. MOLANDER
STANLEY J. GUT
INVENTORS

ATTORNEYS

WILLIAM B. MOLANDER
STANLEY J. GUT
INVENTORS

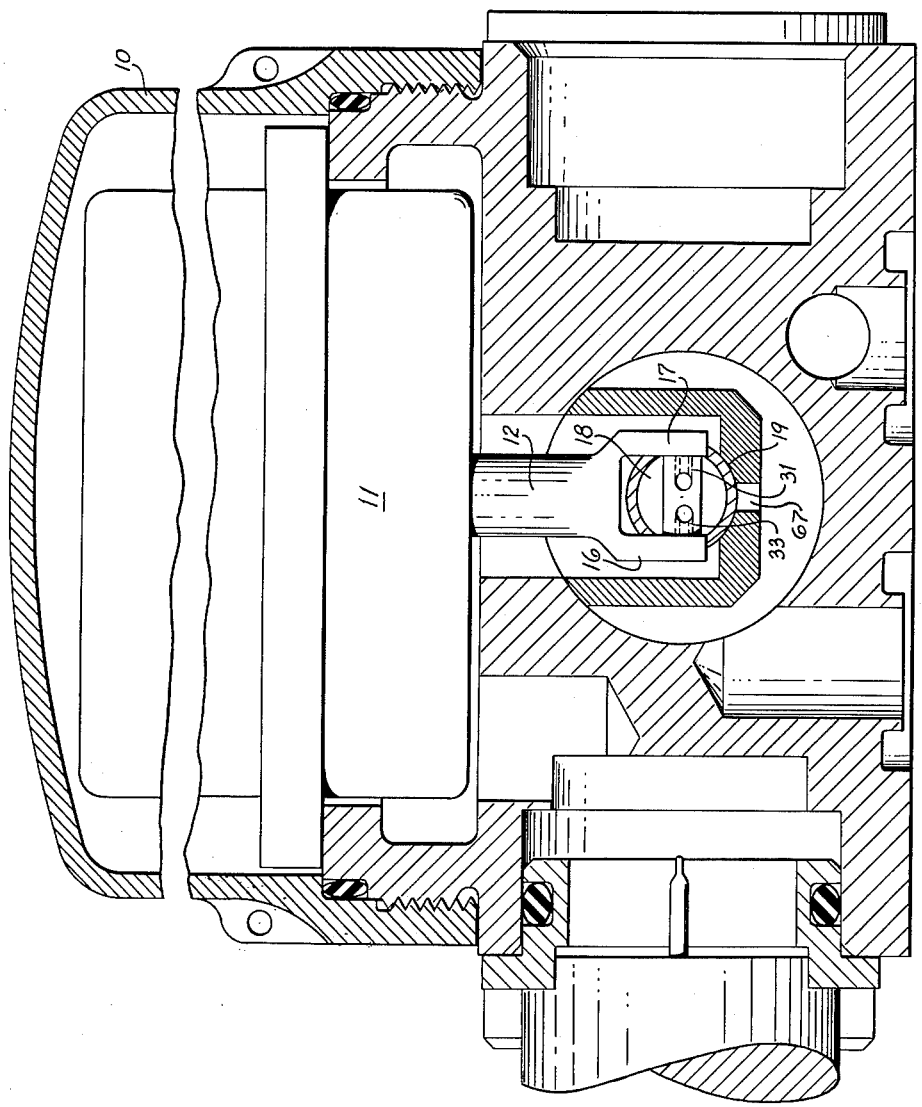

Nov. 20, 1962 W. A. MOLANDER, JR., ET AL 3,065,145
STRADDLE FLAPPER CONTROLLED HYDRAULIC VALVE
Filed June 4, 1959 5 Sheets-Sheet 4

WILLIAM A. MOLANDER
STANLEY J. GUT
INVENTORS

ATTORNEYS

Nov. 20, 1962 W. A. MOLANDER, JR., ETAL 3,065,145
STRADDLE FLAPPER CONTROLLED HYDRAULIC VALVE
Filed June 4, 1959 5 Sheets-Sheet 5
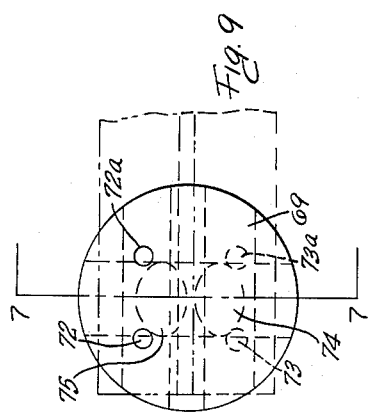
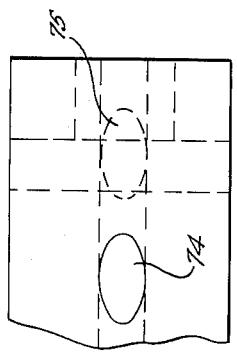
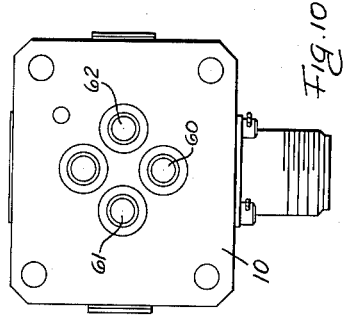
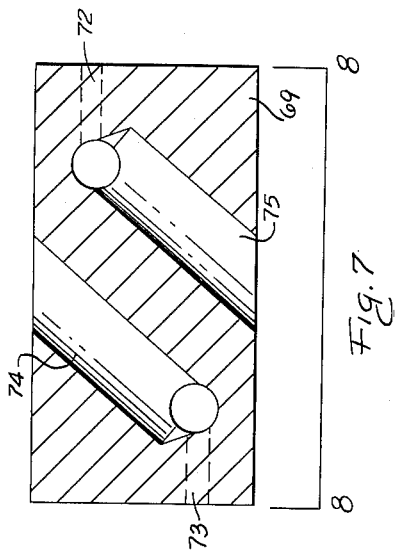
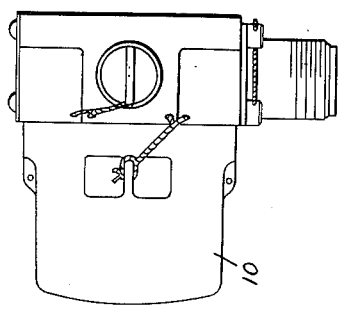
WILLIAM A. MOLANDER
STANLEY J. GUT
INVENTORS
ATTORNEYS

United States Patent Office 3,065,145
Patented Nov. 20, 1962

3,065,145
STRADDLE FLAPPER CONTROLLED HYDRAULIC VALVE
William A. Molander, Jr., Montville, and Stanley J. Gut, Packanack Lake, N.J., assignors to General Precision Inc., a corporation of Delaware
Filed June 4, 1959, Ser. No. 818,210
11 Claims. (Cl. 137—623)

This invention generally relates to improvements in electrically operated hydraulic valves and is particularly concerned with fast acting, high pressure valves useful in the control of aircraft, missiles and for related applications.

This invention is particularly concerned with high pressure valves of the general type disclosed in copending application Serial Number 683,292, filed September 11, 1957, now U.S. Patent No. 3,003,476, and assigned to the same assignee. Such valves are required to be extremely sensitive, small, lightweight, dependable and fast acting, and to provide a large power amplification by responding to a low amplitude electrical signal and variably controlling the flow of hydraulic fluid in a proportional manner over a wide range from a no flow condition to flows of the order to gallons per minute and at pressures ranging from about 500 to 3000 p.s.i. or higher.

In general, this prior application shows a uniquely combined two stage hydraulic valve wherein the first stage or preamplifier responds to a small electrical signal to differentially control fluid pressure that serves to rapidly and forcefully position the spool valve of the second or power stage thereby to regulate larger fluid flows in the hydraulic system proper. The first and second stages therein are so combined that the valve spool or input member of the second stage serves as the output member of the first stage with the net result that the combined two stages possess only two moving parts, a minimum of leakage paths and many other advantages in simplified structure and improved performance over prior art valves.

According to the present invention, there is provided a number of new features of construction in portions of both the first and second stages therein to improve the performance of the valve. A primary advantage of the present valve over prior constructions is its smaller size, greater compactness, and lower cost while providing the desired accuracy and reliability. Among others the present invention also seeks to minimize the leakage and hence maximize the pressure gain or amplification of the first stage of the valve as well as improving its sensitivity and frequency response. One of the most important of these features is in the construction of the first stage movable valve member which is so arranged as to be balanced by the fluid pressures on opposite sides thereof, thereby enabling the valve to operate equally well in regulating relatively low pressure hydraulic fluids at about 300 p.s.i., as well as when handling fluids under higher pressures of the order of greater than 3000 p.s.i. Furthermore with this balanced valve construction, wide variations in the temperature and hence viscosity of the hydraulic fluid may be tolerated without adverse effect, thereby considerably enhancing the versatility of the valve by enabling its use over both wider ranges of pressures and temperatures than heretofore.

In addition to the improved construction of the first stage movable valve member, there is provided various improvements in the fluid transporting and circulating system for the first stage that permits the necessary reduction in pressure for operating the first stage in such a manner as to prevent dirt and foreign particles that may be present in the fluid from clogging the small orifices and passageways of the valve. Since valves of this type are inherently prone to unreliable and undependable operation because of frequent sticking, and even failure caused by contaminating foreign particles in the fluid, these improvements significantly benefit the overall performance of the valve as well as extending its useful life and dependability.

Another important feature of the invention is the provision of larger orifices, passageways, and ports within the valve than are usually provided in valves of this general type, whereby such openings can not be as readily clogged by small solid particle and other foreign matter carried by the hydraulic fluid.

Other changes in the construction and arrangement of the parts are also made for the purpose of simplifying the manufacture and assembly of the valve and enabling its assembly and inspection under almost ideally clean conditions. These changes also provide a more compact packaging of the parts to further reduce the size of the valve and extend its usefulness in aircraft and related applications.

It is accordingly one object of the present invention to increase the sensitivity, power amplification and frequency response of hydraulic valves of this type.

A further object is to provide a high pressure flow control valve that may be successfully employed to regulate fluids over a wide range of different pressures and temperatures.

A still further object is to provide a high pressure flow control valve of improved reliability.

Another object is to provide such a valve that is less susceptible to clogging and contamination by particles in the fluid.

Still another object is to provide a valve that is more easily assembled under cleaner conditions.

Still another object is to reduce the size and weight of the valve and to provide a more integral construction.

Other objects and many attendant advantages will be more readily comprehended by those skilled in the art after a detailed consideration of the following specification taken with the accompanying drawings wherein:

FIGURE 3 is a vertical sectional view taken along line 3—3 of FIGURE 2.

FIGURES 7 to 9, inclusive, are enlarged sectional views illustrating an alternative metering orifice structure according to the present invention, and FIGURES 10 and 11 are elevational views illustrating the valve outer housing in end elevation and side elevation, respectively.

Figure 1:
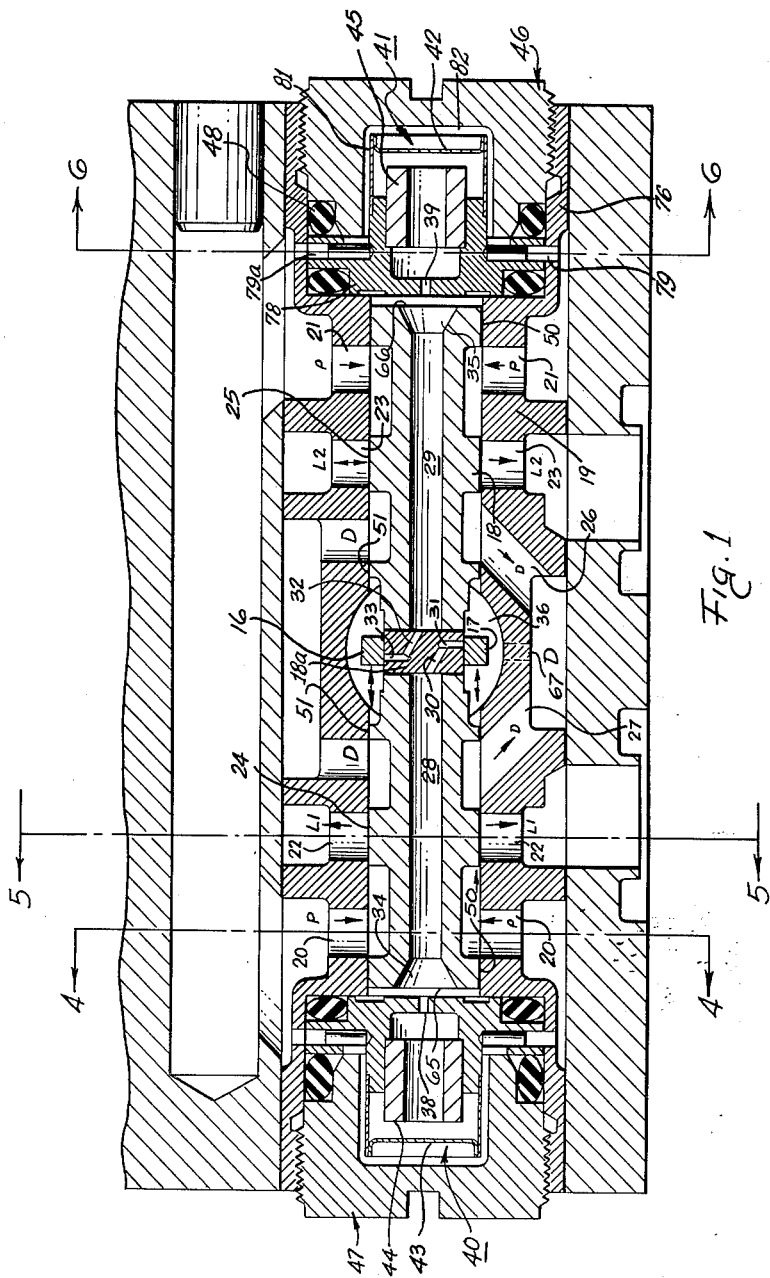
FIGURE 1 is a horizontal sectional view taken along lines 1—1 of FIGURE 2.
Figures 2, 12:
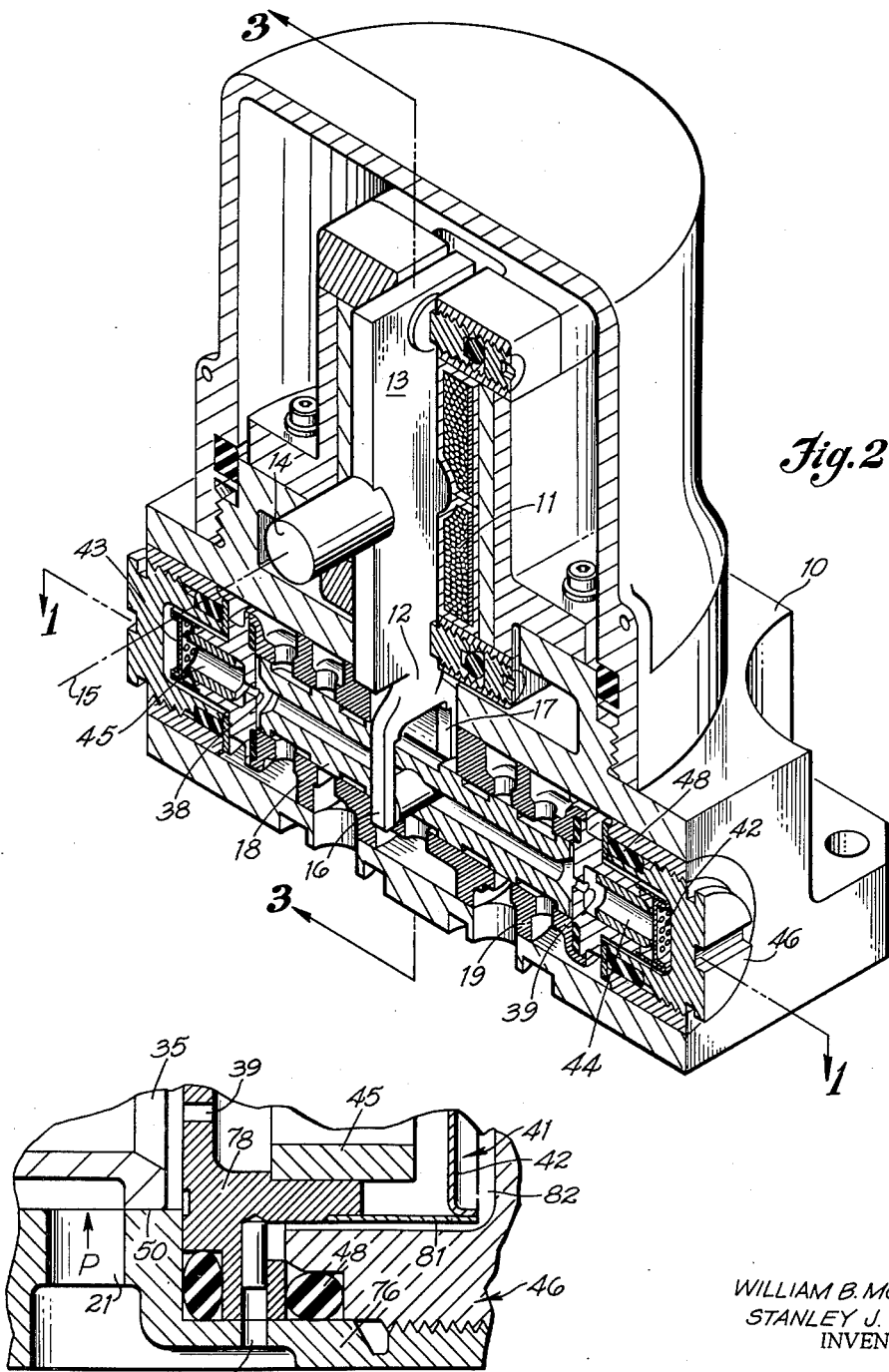
FIGURE 2 is a perspective view, partially in section, of one preferred embodiment of the invention.
Figure 4:
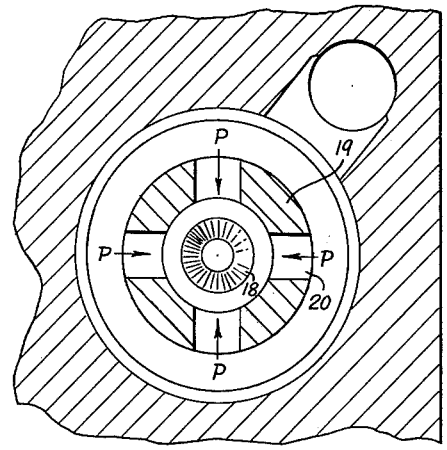
FIGURE 4 is a partial section taken along lines 4—4 of FIGURE 1.
Figure 5:
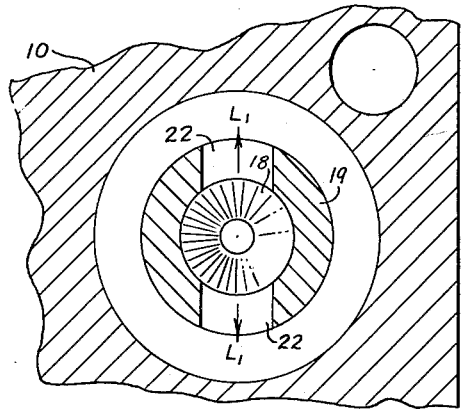
FIGURE 5 is a partial section, taken along lines 5—5 of FIGURE 1.
Figure 6:
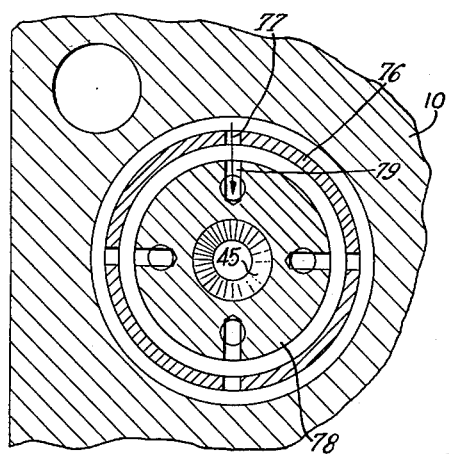
FIGURE 6 is a partial section taken along lines 6—6 of FIGURE 1.

FIGURE 12 is an enlarged section through the sleeve member and insert shown at one end of FIGURE 1.

Referring now to the drawings for a detailed consideration of one preferred embodiment of the invention, there is best shown in FIGURE 2, the overall combination of elements and their compact arrangement within a sealed housing 10. Generally, the preferred hydraulic valve comprises an electromagnetic torque motor generally designated 11 that responds to low amplitude electrical signals to reversibly position a forked valve member or flapper generally designated 12. The forked flapper 12 is preferably an integral extension of the motor armature 13 which is supported by a torsion rod 14 or the like, for restrained movement about the axis 15 of the rod 14.

The forked flapper 12 is provided with two downwardly extending legs or tines 16 and 17 that straddle opposite sides of a horizontally disposed and reciprocally mounted valve spool 18. As thus far described, therefore, the electrical signal being transmitted to the hydraulic valve is directed to energize a torque motor 11, which in turn positions its armature 13 against the restraining force of a torsion rod 14, thereby to displace the legs of the forked valve flapper 12 along opposite sides of a pair of flat surfaces formed on a substantially cylindrical valve spool 18.

Movement of the legs 16 and 17 of the forked valve flapper 12 variably uncovers metering orifices formed in the spool, as will be more fully described hereinafter, to create a greater hydraulic pressure at one end of the spool 18 than at the other with the net result that the spool 18 is displaced axially in the same direction as movement of the fork legs 16 and 17 until the orifices of the spool 18 are again covered by the legs 16 and 17, whereupon the hydraulic pressures on opposite ends of the spool 18 are again equal and the spool remains in this position until the fork legs 16 and 17 of the flapper are further displaced. In other words, the fork member 12 serves as the movable valve of a first stage or preamplifier and movement thereof in response to an electrical signal controls the differential pressure of fluid at opposite ends of the spool 18 to axially position the spool 18 in the same direction as the fork 12.

Referring to FIGURE 1 for a consideration of the second stage operation, the horizontally arranged spool 18 is adapted to slide axially within a generally cylindrically shaped hollow sleeve member 19 formed within the valve body and being provided with a pair of inlet ports 20 and 21 located near opposite ends thereof for introducing pressurized hydraulic fluid, and a pair of outlet ports 22 and 23 also near opposite ends thereof but spaced inwardly from the inlet ports 20 and 21. To regulate the flow of fluid between the adjoining inlet and outlet ports according to the axial position of the spool 18, the spool 18 is provided with a pair of cylindrical land areas 24 and 25 near opposite ends therof, that are so spaced and located as to normally seal the outlet ports 22 and 23 when the spool is axially centered within its sleeve 19, as shown in FIGURE 1. Movement of the spool 18 to the right, for example, displaces the land area 24 to the right and variably uncovers the outlet ports 22 thereby enabling the pressurized fluid entering from its adjoining inlet port 20 to flow into the uncovered outlet port 22 and thence out of the valve and into the remainder of the hydraulic system. Simultaneously, this movement of spool 18 to the right also displaces the opposite land area 25 to the right. However in this case, the opposite outlet port 23 is not opened into communication with its related pressure port 21 but rather is opened into communication with a drain port 26 whereby the pressurized fluid from the opposite inlet port 21 is not permitted to flow through outlet port 23. From the drain port 26, the fluid is transferred to a storage tank or the like (not shown).

In the same manner, a horizontal movement of the spool valve 18 to the left in FIGURE 1 likewise positions its landed areas 24 and 25 to the left, whereupon the righthand outlet ports 23 are opened to the pressurized fluid from inlet potrs 21 but the left-hand outlet ports 22 are sealed from communication with their related pressure port but rather opened to left-hand drain port 27 which is also connected to drain passage 60 (FIGURE 10). Thus, in the second stage operation, horizontal movement of the valve spool 18 to the left enables pressurized fluid to flow through the right-hand outlet port 23 but not the left hand outlet port 22, and movement of the spool to the right uncovers the right-hand outlet port 23, and connects it to the drain passage 26, and covers the left hand outlet ports, thus permitting pressurized fluid to flow through the left-hand port 22 from the pressure passage 21 and thence through hte left-hand outlet passage 61 (FIGURE 10).

As is well known in the art, the inlets ports 20 and 21 are preferably connected by suitable passageways within the valve and external piping to a common source of pressurized fluid or an accumulator containing pressurized fluid (not shown), located externally of the valve, and the outlet ports 22 and 23 leaving the valve may each feed into suitable piping that leads to a hydraulic actuator, motor, or like device whereby movement of the valve spool 18 to the left or right selectively and variably transmits pressurized fluid through one or the other of the outlet ports 22 and 23 to variably and reversibly control the actuator, motor or other as desired.

As thus far described, therefore, there is provided a two stage hydraulic valve having but two moving parts. In the first stage, an electromagnetic torque motor responds to a small electrical signal to position a forked valve flapper 12, constituting the first movable member, over a horizontally arranged reciprocally movable valve spool 18, and this movement is hydraulically amplified to position the valve spool 18 in the same direction as the forked flapper 12. The valve spool 18, constituting the second movable member, is provided with landed areas 24 and 25 which in cooperation with ports formed in the sleeve 19 of the valve forms the second stage thereof to further amplify and control the flow of greater volumes of pressurized fluid to an actuator or other device (not shown) external of the valve.

Returning again to FIGURE 1 for a more detailed consideration of the first and second stages and their unique mode of interaction, the valve spool 18 is provided with two unconnected axial openings 28 and 29 internally thereof. The first or left-hand opening 28 commences at an opening in the left-hand end wall of the spool, at which end it communicates with the left-hand pressure area 65 in the sleeve, and passes centrally therethrough to a position about halfway along its lentgh, and then follows an inclined passageway 30 through a hardened steel insert 18a, fitted to the body of the spool at substantially the center thereof to an orifice 31 through the insert, said orifice opening outside the spool. The right-hand passageway 29 in a similar manner commences at an opening in the right-hand end wall of the spool in communication with the right-hand pressure area 66 formed in the sleeve and extends axially therethrough to a position about halfway along its length and thence follows an oppositely inclined passageway 32 through the insert 18a to an orifice 33 opening on the opposite flat face of the insert 18a. The metering orifice openings 31 and 33 are axially displaced from one another as shown, with the orifice 33 leading from the right-hand passageway 29 being further to the left and with the orifice 31 leading from the left-hand passageway 28 being further to the right.

The opposite surfaces of the insert 18a, through which metering openings 31 and 33 pass are made flat and parallel to one another to provide seats for the downwardly extending legs 16 and 17 of the forked flapper 12.

The metering orifices 31 and 33 are longitudinally offset from one another as shown in FIGURE 1. Alternatively, these orifices may be longitudinally aligned with one another but the forked legs 16 and 17 of the flapper valve member 12 may be offset with the same result.

The tines or downwardly depending legs 16 and 17 of the valve flapper 12 normally cover the metering orifice openings 31 and 32 when the valve flapper 12 and spool 18 are centered within the valve sleeve 19 with the legs 16 and 17 sealing the orifices, whereby no fluid may normally flow through the openings 28 and 29 internally of the valve spool member 18. Thus, if the pressure of the fluid in the area 65 and at the mouth 34 of the left-hand opening 28 equals the fluid pressure in the area 66 and at the mouth 35 of the right-hand opening 29, the spool 18 remains stationary and centered within the valve sleeve 19 and both outlet ports 22 or 23 are sealed by the lands 24 and 25 of the spool 18.

On the other hand, when the movable valve member 12 is displaced by its torque motor 11 and its legs 16 and 17 are positioned to the left, for example, in FIGURE 1, the orifice opening 31 is partially or fully uncovered by movement of leg 17 but the axially displaced opposite orifice opening 33 is not uncovered by leg 16. The full or partial uncovering of orifice 31 permits hydraulic fluid to flow internally of the spool 18 through its opening 28, commencing at the mouth 34 thereof and through opening 28 to inclined passageway 30 and out through orifice 31 to the drain area 36 and thence through drain hole 67 to a storage container or reservoir (not shown). This flow through the left-hand opening 28 reduces the fluid pressure in the area 65 at the left-hand end of the spool 18 and at the mouth 34 of the opening 28, but since no flow is allowed through opposite opening 29, the fluid pressure in the annular area 66 at the right-hand end 35 of the spool 18 remains constant and at a greater pressure than at the left-hand end thereof. As a result this differential pressure slides the spool to the left until the orifice opening 31 again passes under and is sealed by the leg 17 of the flapper, thereby preventing further flow through opening 28 and again equalizing the fluid pressure in the areas 65 and 66 at opposite ends of the spool 18. In the same manner, a displacement of the fork flapper 12 to the right partially or completely uncovers metering orifice 33, and thereby causes fluid flow through the opposite passageway 29 and out of orifice 33 to drain 36 and out through drain opening 67, thereby serving to decrease the pressure in the area 66 at the right end of the spool 18 below that of the opposite area 65 at the left end thereof, whereupon the resulting differential pressure slides the spool 18 to the right until orifice 33 is again sealed by flapper leg 16 and the fluid pressures operating upon the spool 18 at both ends thereof are balanced.

Thus, the first stage of the valve operates to hydraulically slide the valve spool 18 to the left or right within its sleeve 19 in response to small electrical signals energizing the torque motor 11 in the manner of a hydraulic follow-up system wherein the spool 18 is rapidly and forcefully compelled to follow the displacement of the fork flapper 12.

It is, of course, necessary that the hydraulic differential pressures used to position the spool 18 in the first stage operation, as described above, be reduced considerably from the fluid supply pressures during such periods as movement of spool 18 is desired and for this purpose there is provided fixed pressure reducing orifices 38 and 39 leading into the areas 65, 66 at the opposite ends of the spool 18, as shown.

As best shown in FIGURE 1, the opposite end of these pressure reducing orifices 38 and 39 may open into filtering chambers 40 and 41 formed at opposite ends of the valve into which the high pressure fluid from the reservoir (not shown) may be introduced through suitable passageways. Since these pressure reducing orifices 38 and 39 must necessarily be made much smaller than the fluid passages in the second stage of the valve, considerable difficulties have been had in the past in preventing these orifices from becoming partially, and even fully, clogged by the collection of dirt and other foreign matter in the hydraulic fluid, as well as by metal particles such as burs and the like which may become loosened and torn away from the piping, conduits, passageways and other parts of the fluid transmission system as well as from the machining and grinding of the various cavities and passageways in the housing, sleeve and spool. The presence of such dirt and foreign matter collecting near or in the orifice openings 38 and 39 serves to reduce and even prevent the flow of hydraulic fluid therethrough, thereby rendering the valve extremely sluggish in operation and reducing its sensitivity and frequency response. Obviously if the orifices 38 and 39 should become completely plugged or sealed by the loose particles, the valve spool 18 cannot be positioned to open and close the second stage outlet ports 22 and 23 and the valve becomes inoperative. For this reason it is essential that the valve be initially assembled under the most clean and sanitary conditions and that the fluid being permitted to pass therethrough be extremely well filtered to remove any dirt or other foreign matter from reaching the orifices 38 and 39 or the metering orifices 31 and 33 formed in the valve spool 18.

To provide this filtering function, each of the filtering chambers 40 and 41 is provided with a perforated filter screen 42 and 43, respectively, and located at the entrance thereof, through which all fluid entering the chambers 40 and 41 from the pressure reservoir or accumulator (not shown) must pass. These screens 42 and 43 serve to prevent solid particles and other matter larger than the preforated openings therein to pass into the first stage but do necessarily permit some of the smaller particles to pass therethrough. However, despite the addition of the filtering screen, it has been found that tiny metallic particles passing therethrough still prove troublesome in the operation of the valve and according to the present invention there is provided additional means for preventing such metallic particles from reaching the orifices 38 and 39. To accomplish this function according to the present invention, there is provided in each filtering chamber 40 and 41, a cylindrical magnetic trap 44 and 45, which, as shown in FIGURE 1 and FIGURE 2, may comprise a hollow cylindrical permanent magnet member tightly fitted to the inner wall of the chamber and coaxial with the fixed pressure reducing orifice but being slightly spaced therefrom. Each of the magnetic traps 44 and 45 is so positioned and fitted within the chamber that all of the hydraulic fluid being directed into the pressure reducing orifice of that chamber passes through the central opening of the cylindrical trap and thus passes through the magnetic field thereof. Consequently, all particles of magnetically sensitive material are attracted to the inner wall of the hollow magnet cylinder and hence prevented from entering the mouth of either pressure orifice 38 and 39. Thus, according to the present invention, the pressurized fluid for use in the first or preamplifier stage is first filtered through a screen 42 and 43 and thence passed through a magnetic filter trap 44 and 45 to further remove all magnetically sensitive small particles therefrom before passing into the pressure reducing orifices 38 and 39. Consequently, substantially all solid foreign matter is removed from the hydraulic fluid before reaching the orifices 38 and 39 with the net result that the sensitivity, frequency response, and reliability of the valve are vastly improved.

To insure that the filtering chambers 40 and 41, as well as the orifices 38 and 39, and other members are completely clean of dirt and other foreign matter at the time of assembling the valve, and to permit all such critical ports to be easily inspected during assembly, the filtering chambers and pressure reducing orifices are all preferably disposed in axial alignment with one another and so constructed as to be readily visible and accessible by removing the end plugs 46 and 47 which are screw threaded into the housing 10, as best shown in FIGURE 1. More specifically, the end plugs 46 and 47 are each disposed in axial alignment with the magnetic trap members 44 and 45, the pressure reducing orifices 38 and 39, and the movable spool valve member 18, whereby in initially assembling and inspecting the valve, or in later servicing thereof, the removal of the end plugs 46 and 47 readily displays these ports for easy accessibility, as best shown in FIGURE 1. To prevent leakage through the threaded connection between the end plugs 46 and 47 and the housing 10, the inner terminal portion of the plugs may be formed with a depressed region for accommodating an O-ring seal 48, as shown, whereby the seal 48 is deformed between the plug and housing to prevent hydraulic fluid within the filter chamber from leaking out of the valve through the threads of the plugs.

Recapitulating, the overall operation of the valve in regulating large fluid flows in response to a small electrical signal, the electrical input signal is directed to energize a torque motor 11, thereby to position a forked valve flapper 12 of the first stage with respect to a valve spool 18. The forked flapper 12 is provided with two downwardly depending legs 16 and 17 straddling opposite sides of the horizontally arranged spool. The spool in turn is permitted limited axial movement within a one-piece tubular sleeve member 19 fitted within the valve body, and is provided with two unconnected axial openings 28 and 29 therethrough, each opening at opposite ends of the spool and in communication with hydraulic fluid under pressure at the annular areas 65, 66 at the ends of the spool. Fluid pressure is admitted to bear against both ends of the spool and this pressure is equal and opposite when the flapper legs 16 and 17 are centered with respect to the spool. More specifically, the legs need not necessarliy be centered so long as they are properly positioned to cover the metering orifices 31 and 33. However, upon the forked valve being displaced, metering orifices in the spool are selectively partially or fully uncovered, thus enabling the pressurized fluid at the ends of the spool to flow through one or the other of its internal axial openings, thereby to reduce the fluid pressure at one end thereof and axially displace the spool 18 in the same direction as movement of the forked valve 12 until the forked valve again covers and seats on the spool metering orifices.

The spool 18 also serves as the input member of the second stage of the valve and is provided with landed areas 24 and 25 for controlling the main flow of hydraulic fluid through the valve. Consequently upon the spool 18 being axially displaced by operation of the first stage of the valve, the main flow of hydraulic fluid is alternately controlled over outlet ports 22 and 23, depending upon the direction of movement of the spool 18, as well as the extent of movement thereof. Thus the only two movable members of the valve are the forked valve flapper 12 and the valve spool member 18, both being interconnected in hydraulic feedback in the first stage of the amplifier. To isolate the higher fluid pressure in the second stage from the lower pressures for positioning the spool valve member 18, the spool is also provided with additional land areas 50 at each end thereof which cooperate with portions of the sleeve to prevent the higher pressures at the inlet ports 20 and 21 from leading into the lower pressure areas at the ends of the spool. Additional spaced land areas 51 are also provided on opposite sides of the central portion of the spool 18, to isolate the main fluid outlet ports 22 and 23 from the drain ports 36 and the metering orifices 31 and 33.

According to a preferred embodiment of the present invention, the sleeve member 19 within which are formed the inlet and outlet ports and the areas mating with the lands of the spool 18, is preferably formed in a one-piece unitary construction. The pressure reducing orifices 38 and 39 for the first stage are formed in individual plugs fitted to the ends of the sleeve. The sealing caps are also threadably fitted to the extreme ends of the sleeve. With such a unitary construction, the sleeve may be accommodated directly into various linear and rotary actuator devices (not shown) thereby achieving considerable reduction in the volume and overall weight of the hydraulic system.

It is also to be particularly noted that the straddling fork construction of the first stage movable valve flapper 12 provides a considerable improvement over known sliding valve constructions, since it is subject to a balanced fluid force operating outwardly from the oppositely arranged metering orifices 31 and 33 of the spool 18. More specifically when the legs 16 and 17 of valve flapper 12 are both positioned to seal orifices 31 and 33, the fluid pressure through orifice 33 pushes upwardly against leg 16 (in FIGURE 1) whereas the fluid pressure through orifice 31 pushes in the opposite direction or downwardly against leg 17 (FIGURE 1). Since these fluid pressures are equal, the valve legs 16 and 17 are balanced and possess substantially the same leakage clearance with respect to the orifices. Consequently so long as the fluid pressure being exerted against the legs from the orifices are the same, the absolute magnitude of this pressure is substantially immaterial and the valve flapper 12 operates with equal facility whether the fluid is at a pressure of 300 p.s.i. or 3000 p.s.i. On the other hand, if the orifices 31 and 33 were both located on the same side of the spool 18 and both legs 16 and 17 did not straddle the spool but were positioned on the same side thereof, the leakage therethrough would be considerably greater at pressures of 3000 p.s.i. than at pressures of 300 p.s.i. This would be true since the fluid pressure from both orifices would be focused in the same direction with respect to the valve flapper 12, thus tending to push the flapper away from the spool 18. Considering an example of the latter case, if the valve were designed for operation at 300 p.s.i., the clearance between the valve legs and the orifices would be made such that no tight contact existed between the two members for the purpose of enabling the valve to be easily positioned by the torque motor 11. However, when subjecting this same valve to a higher pressure of 3000 p.s.i., the increased pressure force would necessarily increase the clearance by pushing away the flapper from the spool, thereby considerably increasing the leakage and reducing the amplification of the first stage. In the present invention, on the other hand, the fluid pressures operate against legs 16 and 17 in opposite directions, whereby an increased pressure does not tend to push either leg away from the spool 18 since equal and opposite pressures are applied to both legs of the flapper.

The operation of the valve shown in FIGS. 1 and 2 is substantially as follows:

Hydraulic fluid under pressure is fed through the inlet ports 20, 21 through the hollow sleeve member 19.

The fluid passes through a plurality of radially positioned openings 79, 79a cut through an insert 78, fitted to each expanded end 76, 76a of the sleeve member.

A tubular extension FIGURE 1, is fitted to the reduced diameter section of each insert 78, 81 shown in FIGURE 1, to support the screen 42, 43 located at each end of the valve, within the end plug 46, 47 inserted in each end of the sleeve member.

From the radially positioned openings 79, 79a through the insert, the fluid under pressure passes through an annular area between a counterbore 82 at the inner end of each end plug 46, 47, and the tubular extension 81, to the cylindrical area located at the bottom of the counterbore 82 through the end plug between the bottom of the counterbore and the screen 42, 43.

After passing through the screen 42, 43 and the magnetic filter trap, 44, 45, the fluid passes through the pressure reducing orifices 38, 39 through the inserts 78, to the annular areas 65, 66 at both ends of the spool. The fluid pressure in the cylindrical regions at both ends of the spool is equalized when the legs of the flapper are in the position shown in FIGURE 1, both metering openings being closed.

The operation of the flapper and the movement of the spool relative to the sleeve member, under control of the flapper was hereinbefore described in detail.

When one of the orifices 31, 33 is uncovered by the flapper 12, fluid passes from the passageways 28 and 29, through the metering opening 31 or 33 into the drain area 36, and out through the drain opening 67, which is connected to the fluid storage means.

When the spool 18 is displaced from the position shown in FIGURE 1, the fluid from the drain area 36, passes through one of the passages 26, 27, depending upon the direction of the displacement of the spool, to the fluid storage means.

When the spool is displaced toward the right of FIGURE 1, in the manner hereinbefore described, the land area normally covering the port 22 is moved rightward thereby directly connecting the inlet ports 20, with the outlet port 22.

When the spool 18 is moved leftward, the same condition applies to the right-hand ports 21 and 25, direct connection being established between the inlet ports 21, and the outlet ports 25, the fluid being discharged to the fluid storage means.

FIGURES 7 to 9, inclusive, illustrate an alternative embodiment of the invention wherein the spool valve 69 is provided on each of its opposite sides with a pair of shear metering orifices 72, 72a and 73, 73a in each face, as best shown in FIGURE 8. In this embodiment the metering orifices 72 and 73 through the spool 69 each represents both orifices 72, 72a, 73, 73a on that side, the orifices being in direct communication with inclined passageways such as shown at 74 and 75. The advantages provided by the two orifice arrangement over the single metering orifice of FIGURES 1 and 2 is to first provide a balanced torque on each of the surfaces and of the flapper member which slide over the face of the spool, thereby insuring that the spool 69 and the valve flapper are maintained in balance and the spool is always ultimately positioned properly with respect to the flapper. The two metering orifices, such as 72, 72a and 73, 73a, on each face are, in effect, separated by an arm of the flapper similar to 16, 17, shown in FIGURE 1, when the flapper is displaced by the torque motor. This produces a torque on the spool 69, causing the spool to be ultimately positioned parallel to the arms of the flapper. Secondly, if one of the orifices on either side of the spool should become clogged, the presence of an additional orifice insures that the valve does not become inoperative, since the valve may continue to operate with only one free or unclogged metering orifice on each side thereof in all other respects, this spool construction is essentially the same as that shown in FIGURE 1.

Under ideal conditions for operating a valve of this type it would be desirable to have a vacuum, or extremely low pressure, in the annular area at one end of the spool 18 and full line pressure at the opposite end to assure maximum force and velocity of the spool, and maximum response to signals received by the flapper control member.

With applicants' type of valve, as hereinbefore described, a pressure of up to 90% the full line pressure, or pressure up to 2750 pounds per sq. in. where a 3000 lbs./sq. in. line pressure is used, is available in the pressure area at one end of the spool 18.

This is far superior in overall performance characteristics and response to any of the valves now available which employ what is known as the "open center" nozzle control construction, on valves in which a flapper is located between two spools or nozzles, the flapper being adapted to partially seal the opening in one spool or nozzle, while the opening in the other spool remains open.

This open center type of valve is sharply restricted in its range of operation because of the continuous leakage through the opening in one of the spools or nozzles, which necessitates an excessive oil supply, tends to reduce pressures, and therefore, affects the valve operation and response.

While the direction of the spool movement is described as following generally the direction of movement of the flapper 18, this is merely one arrangement of the combination.

In the construction shown in FIGURE 1, the upper metering opening 33 is offset to the left of the center of the spool, the opening being connected to the right-hand end of the spool, whereas the lower metering opening is offset to the right and connected to the left-hand end of the spool.

By offsetting the metering openings in the opposite direction, or by centering the metering openings relative to the center of the spool, and offsetting the legs of the flapper 12, or by connecting the individual metering openings to ends of the spool opposite those shown in FIGURE 1, this relation can be altered to suit any set of requirements.

Under normal conditions, the fluid pressure in the two cylindrical areas 65, 66 at both ends of the spool 18 is equalized. When one of the metering orifices 31, 33 of the spool insert is uncovered by one of the legs 16, 17 of the flapper, it allows the fluid to be discharged through the uncovered metering opening 31, 33.

This allows the spool to move in the direction of the area of reduced pressure, until both metering openings are again covered.

The surfaces of the insert 18a, through which the metering openings 31 and 33 pass are flat and parallel to one another to provide sealing seats for the legs 16, 17 of the flapper 12.

The metering openings 31, 33 may be longitudinally offset as shown in FIGURE 1 or aligned with one another depending upon the relative arrangement of the legs 16, 17 of the flapper. Where the openings 31, 33 are axially aligned with one another, the legs similar to 16, 17 of the flapper may be longitudinally offset relative to one another, the operating effect of the flapper being substantially the same as that shown in FIGURE 1.

While the legs 16, 17 of the flapper are not necessarily centered they are so positioned as to cover both metering openings 31 and 33.

What is claimed is:
1. In a high pressure two-stage hydraulic valve
    a valve sleeve member provided with inlet and outlet ports for conveying a high pressure fluid supplied from an external fluid supply source;
    a valve spool member axially slidable in the sleeve and provided with external land areas mating with the ports in the sleeve for regulating the size of the opening of the inlet and outlet ports in communication with each other in accordance with its axial position, said spool member having a pair of unconnected openings internally thereof, each communicating with a different opposite end of the spool and leading to a small metering orifice near the center of the spool, said metering orifices opening on opposite sides of the spool, the sleeve having a cylindrical region at each end of the spool;
    means supplying fluid under pressure from the external fluid supply source to the cylindrical regions at said ends of the spool; and,
    a first stage movable flapper member having a pair of legs straddling the spool to normally seal said metering orifices when the spool is axially centered within the sleeve, said first stage flapper member being reversibly displaceable relative to the spool member in response to a command signal to thereby selectively open the metering orifices, the fluid pressure in the cylindrical regions at both ends of the spool being substantially equalized when the flapper member seals both metering openings, the fluid pressure in the cylindrical region at one end of the spool being reduced relative to that in the cylindrical region at the opposite end thereof when the metering opening in communication with the cylindrical region at said one end is uncovered by the flapper member, thereby causing said spool to be axially displaced in the direction of the reduced pressure cylindrical region at said one end of the spool until the metering orifices are again sealed by the legs of the flapper member.
2. In the valve of claim 1, said sleeve member having a substantially cylindrical plug fixedly inserted in each end thereof, and each plug having a fixed size orifice opening near one end of the spool member and co-axial therewith.

3. In the valve of claim 2, filter means supported in advance of said fixed size orifice openings, said filter means including a perforated screen for removing solid particles from the fluid.

4. In the valve of claim 3, said sleeve member being of integral construction and threadably supporting said plugs, and with said fixed orifices and filtering means being positioned in axial alignment with the sleeve.

5. In the valve of claim 4, said filtering means including a permanent magnet member for removing particles of magnetically susceptible material from the fluid that succeeds in passing through the filter screen.

6. In the valve of claim 5, a housing, said sleeve member being housed therein, said filtering means and fixed orifices being positioned near the opposite sides of the housing, said housing being provided with openings in axial alignment with said filter means and fixed orifices, thereby enabling said sleeve to be easily assembled, inspected and cleaned, and a pair of sealing means threadably fitted to the housing to seal said openings in a fluid tight manner.

7. In the valve of claim 1, wherein that portion of the spool through which said orifices pass has a pair of substantially parallel flats therein, the legs of said flapper member straddling said flats.

8. In the valve of claim 1 in which the flapper legs are laterally offset relative to one another and to the axis of the metering orifices through the spool.

9. In the valve claim 1 in which said metering orifices are slightly displaced axially from one another.

10. In a high pressure two-stage valve having:
a valve sleeve member provided with inlet and outlet ports for conveying fluid under pressure supplied from an external source to to the interior thereof,
an axially movable spool valve member slidably fitted within the sleeve member in the second stage for controlling the main flow of fluid, the first stage regulating hydraulic pressure to axially position the spool, the sleeve member having a cylindrical region at each end of the spool, and,
means for supplying fluid under pressure from an external fluid supply source to the cylindrical regions at both ends of the spool;
the improvement wherein;

said spool is provided with two unconnected passageways internally thereof, said spool having an insert or hardened material fitted thereto at substantially the longitudinal center thereof, the insert having a pair of substantially parallel flats thereon, each of the passageways leading to an orifice through the flat faces on opposite sides of the insert; and,
a first stage forked flapper member having legs that straddle opposite sides of the insert to normally seal said metering orifices,
whereby upon said passageways receiving fluids at equal pressure from the cylindrical regions at both ends of the spool, the fluid force acting upon each leg of the flapper member is equal in magnitude and operates in a direction opposite to the force on the other leg to thereby balance said flapper member, the fluid pressure in the cylindrical regions at both ends of the spool being reduced relative to that in the cylindrical region at the opposite end of the spool when the orifice in communication with the cylindrical region at said one end is uncovered by the flapper member, thereby causing the spool member to be axially displaced relative to the sleeve member, in the direction of the reduced pressure cylindrical region at said one end of the spool, until the orifices through the spool are again sealed by the flapper member 11. In the valve of claim 10, each of said unconnected passageways leading to a pair of spaced orifices on opposite sides of the spool.

References Cited in the file of this patent

UNITED STATES PATENTS

| | | |
|---|---|---|
| 2,478,290 | Lindner | Aug. 9, 1949 |
| 2,767,689 | Moog | Oct. 23, 1956 |
| 2,797,666 | Chubbuck | July 2, 1957 |
| 2,936,783 | Moffatt | May 17, 1960 |
| 2,964,018 | Farron | Dec. 13, 1960 |
| 3,003,476 | Thomas | Oct. 10, 1961 |

FOREIGN PATENTS

| | | |
|---|---|---|
| 492,292 | Germany | Feb. 22, 1930 |
| 525,878 | Germany | June 4, 1931 |